United States Patent
Ando et al.

(10) Patent No.: US 6,703,442 B1
(45) Date of Patent: Mar. 9, 2004

(54) TWO-PACK TYPE CURABLE COMPOSITION AND HARDENER THEREFOR

(75) Inventors: Hiroshi Ando, Hyogo (JP); Yoshiteru Masaoka, Hyogo (JP); Atsushi Fukunaga, Hyogo (JP); Fumio Kawakubo, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/701,011

(22) PCT Filed: Mar. 22, 2000

(86) PCT No.: PCT/JP00/01750

§ 371 (c)(1),
(2), (4) Date: Nov. 22, 2000

(87) PCT Pub. No.: WO00/56817

PCT Pub. Date: Sep. 28, 2000

(30) Foreign Application Priority Data

Mar. 24, 1999 (JP) .......................................... P.11-079533

(51) Int. Cl.$^7$ ........................ C08L 83/00; C08G 77/80
(52) U.S. Cl. ...................... 524/588; 524/115; 524/284; 524/300; 524/306; 524/464; 524/487; 528/18; 528/27; 528/34
(58) Field of Search .................... 524/588, 18, 34, 524/38, 284, 300, 115, 464, 487, 19, 558, 127, 145, 306, 292, 500; 528/27, 18, 34, 38; 525/476; 523/107, 400, 451, 455, 465

(56) References Cited

U.S. PATENT DOCUMENTS

| | | | |
|---|---|---|---|
| 4,657,986 A | | 4/1987 | Isayama et al. |
| 4,929,702 A | | 5/1990 | Cavezzan et al. |
| 4,965,311 A | * | 10/1990 | Hirose et al. ............... 524/284 |
| 5,061,739 A | | 10/1991 | Shimizu |
| 5,063,270 A | * | 11/1991 | Yukimoto et al. ........... 427/387 |
| 5,336,703 A | * | 8/1994 | Homma et al. .............. 523/435 |
| 5,541,266 A | * | 7/1996 | Hasegawa et al. .......... 525/403 |
| 5,703,178 A | * | 12/1997 | Gasmena ..................... 525/476 |
| 6,025,416 A | * | 2/2000 | Proebster et al. ........... 523/333 |
| 6,130,306 A | * | 10/2000 | Kalinowski et al. ........ 525/403 |
| 6,410,640 B1 | * | 6/2002 | Fukunaga et al. ........... 524/588 |

FOREIGN PATENT DOCUMENTS

| | | | |
|---|---|---|---|
| EP | 0 473 793 A1 | 3/1991 | |
| JP | 55-31874 | 3/1955 | |
| JP | 57-182350 | 11/1982 | |
| JP | 58-2326 | 7/1983 | |
| JP | 6-57121 | 3/1994 | |
| JP | 7-207166 | 8/1995 | |
| JP | 2001152092 A * | 6/2001 | ......... C09D/183/04 |

* cited by examiner

*Primary Examiner*—Robert Dawson
*Assistant Examiner*—Marc Zimmer
(74) *Attorney, Agent, or Firm*—Armstrong, Kratz, Quintos, Hanson & Brooks, LLP

(57) ABSTRACT

The invention provides a curing agent for two-pack type curable composition use having excellent storage stability, and also provides a curing agent composition which comprises a hydrolyzable silyl group-containing compound (a), a non-phthalic acid ester based plasticizer (b) having no phthalic acid ester structure in its molecule, and a bivalent tin based curing catalyst (c), that satisfies all of mechanical properties, recoverability and adhesiveness to substrate, can be mixed easily when used and has excellent storage stability, and a two-pack type curable composition which hardens when a base resin composition comprising a curable organic polymer (d) having in its molecule a functional group crosslinkable by a reaction catalyzed by a bivalent tin based curing catalyst (c), an epoxy group-containing silane compound (f) and an epoxy compound (g) is mixed with the above curing agent composition.

8 Claims, No Drawings

TWO-PACK TYPE CURABLE COMPOSITION AND HARDENER THEREFOR

TECHNICAL FIELD

This invention relates to a two-pack type curable composition containing a curable organic polymer having in its molecule a functional group crosslinkable by a reaction catalyzed by a bivalent tin based curing catalyst.

BACKGROUND ART

Examples of known compositions comprising a curable organic polymer having in its molecule a functional group crosslinkable by a reaction catalyzed by a bivalent tin based curing catalyst include an organic polymer which has a silicon-containing group (may be referred to as reactive silicon group hereinafter) having a hydroxyl group and/or hydrolyzable group bonded to a silicon atom and crosslinkable by forming a siloxane bond, an organic polymer which has an isocyanate group and a composition comprised of a hydroxyl group-containing organic polymer and a polyisocyanate compound. Particularly, an organic polymer having its bone structure comprised of such as of polyoxyalkylene or polyisobutylene is already produced industrially and used in various curable compositions.

Among them, polyoxyalkylene based polymers and polyisobutylene based polymer having reactive silicon groups are disclosed for example in JP-A-52-73998, JP-A-5-125272, JP-A-63-6003, JP-A-63-6041, JP-A-1-38407 and JP-A-8-231758 (the term "JP-A" as used herein means an "unexamined published Japanese patent application"), and, like the case of room temperature-curable silicon rubber, they harden and give rubber-like hardened products at room temperature by forming a siloxane bond (Si—O—Si) between polymers by the action of moisture in the air or water in a composition.

A polyoxyalkylene based polymer having isocyanate group also hardens and gives a rubber-like hardened product at room temperature by forming a urea bond or urethane bond between polymers by the action of moisture in the air or the like. In addition, a composition comprised of a polyoxyalkylene based polymer having hydroxyl group and a polyisocyanate compound also hardens and gives a rubber-like hardened product by forming a urea bond or urethane bond between polymers by a reaction generated by mixing of these components.

It is known that the crosslinking reaction of these polymers is considerably accelerated by the presence of a tin compound, and, making use of this characteristic, they are broadly used in sealants, adhesives, paints and the like applications as a two-pack type curable composition by dividing a curable organic polymer having in its molecule a crosslinkable functional group and a catalyst component into solution A and solution B.

Various characteristics are required for the curable compositions to be used in sealants, adhesives and the like and the rubber-like hardened products obtained by their hardening and, in addition to modulus, breaking elongation, breaking strength and the like mechanical properties, recovery and adhesiveness for substrate are particularly important characteristics which have therefore been extensively studied. As a result, it is known that the modulus, breaking elongation, breaking strength and the like mechanical properties suitable for sealing materials can be obtained by adding a phthalic acid ester or the like plasticizer to a curable composition. It is known also that the recovery can be improved by the use of a bivalent tin based curing catalyst in comparison with the use of a tetravalent tin based catalyst. In addition, when made into a two-pack type curable composition, it is broadly carried out to control volume and viscosity of a curing agent as a component of the curing catalyst-containing counter part by adding a plasticizer, filler or the like, for the sake of its easy weighing and dispersion at the time of its mixing with the base resin. On the other hand, it has been discovered by the present inventors that markedly excellent adhesiveness, particularly adhesiveness for mortar slabs, is generated by the joint use of an amino group-containing silane compound as a compound which has both of an amino group and a hydrolyzable silyl group in its molecule, an epoxy group-containing silane compound as a compound which has both of an epoxy group and a hydrolyzable silyl group in its molecule and an epoxy resin as an adhesiveness provider.

However, when the present inventors have examined a curable composition comprised of an amino group-containing silane compound, an epoxy group-containing silane compound, an epoxy resin, a bivalent tin based curing catalyst as the curing catalyst and a plasticizer, in order to obtain a curable composition which satisfies all of the mechanical properties, recovery and adhesiveness for substrate, based on known techniques and the above discovery, it was revealed that this composition has a serial problem of being poor in storage stability. That is, reduction of adhesiveness was found after storage of the one-pack type composition containing all components. This is considered to be due to a reaction of the epoxy groups of the epoxy group-containing silane compound and epoxy resin with the amino group of the amino group-containing silane compound. In consequence, an attempt was made to prepare a two-pack type curable composition by dividing it into solution A and solution B in order to avoid coexistence of the amino group-containing silane compound with the epoxy group-containing silane compound and epoxy resin, but, in this two-pack type curable composition which respectively contains a curable organic polymer crosslinkable in the presence of a bivalent tin curing catalyst and having in its molecule a functional group crosslinkable by a reaction and an amino group-containing silane compound as the solution A components, and, an epoxy group-containing silane compound, an epoxy resin, a curing catalyst and a plasticizer for viscosity controlling use as the solution B components, its use became difficult because of the increase in viscosity during its storage, which seemed to be due to a catalytic reaction of water in the solution A with the amino group.

Accordingly, the object of the invention is to provide a curing agent for two-pack type curable composition use having excellent storage stability and also a two-pack type curable composition which satisfies all of the mechanical properties, recovery and adhesiveness for substrate, can be easily mixed when used and has excellent storage stability.

DISCLOSURE OF THE INVENTION

With the aim of solving the above problems, the present inventors have conducted intensive studies and found as a result of the efforts that the activity reduction and deactivation of curing catalysts, which have generally been considered to be due to adsorption and degeneration of catalyst species caused by added inorganic fillers, were actually caused by a completely different phenomenon, thus resulting in the resolution of the above problems.

Illustratively, in the case of a two-pack type curable composition which respectively contains a curable organic polymer, an epoxy group-containing silane compound and an epoxy resin as the solution A components and an amino group-containing silane compound, a curing catalyst and a plasticizer for viscosity controlling use as the solution B components, it was revealed that catalytic activity of the curing agent is considerably reduced after its storage and the curing rate is sharply reduced. In addition, a new surprising fact was discovered that reduction of the catalytic activity is not observed in the coexistence of a phthalic ester based plasticizer and a bivalent tin based curing catalyst, or in the coexistence of an amino group-containing silane compound, epoxy group-containing silane compound or the like compound containing a hydrolyzable silyl group in its molecule (to be referred also to as hydrolyzable silyl group-containing compound hereinafter) and a bivalent tin based curing catalyst, independent of the presence or absence of inorganic fillers, but activity of the bivalent tin based curing catalyst (c) is lost in the coexistence of the phthalic ester based plasticizer, hydrolyzable silyl group-containing compound and bivalent tin based curing catalyst (c), due to a reaction caused by three compounds. Based on this discovery, it was found that a curing agent for two-pack type curable composition use having good storage stability can be obtained as a curing agent (solution B) when a non-phthalic acid ester based plasticizer which is characterized by the absence of phthalic acid ester structure in its molecule is used as the plasticizer necessary for improving mixing ability with the base resin (solution A) in the presence of a bivalent tin based curing catalyst (c) as the curing catalyst and a hydrolyzable silyl group-containing compound such as an amino group-containing silane compound necessary for giving adhesiveness, thus resulting in the accomplishment of the invention.

In addition, it was found that a two-pack type curable composition which satisfies all of the mechanical properties, recovery and adhesiveness for substrate, can be easily mixed when used and has excellent storage stability can be obtained by the use of a curing agent which contains an amino group-containing silane compound, a bivalent tin based curing catalyst (c) and a non-phthalic acid ester based plasticizer and of a base resin to which an epoxy group-containing silane compound and an epoxy resin are added, thus resulting in the accomplishment of the invention.

Accordingly, a first embodiment of the invention relates to a curing agent composition which comprises a hydrolyzable silyl group-containing compound (a), a non-phthalic acid ester based plasticizer (b) having no phthalic acid ester structure in its molecule, and a bivalent tin based curing catalyst (c).

As a preferred embodiment, it relates to the above curing agent composition, wherein at least one species of the hydrolyzable silyl group-containing compound (a) is an amino group-containing silane compound (e).

As a more preferred embodiment, it relates to the above curing agent composition, wherein the non-phthalic acid ester based plasticizer (b) is a polyether based plasticizer and/or a hydrocarbon based plasticizer.

As a more preferred embodiment, it relates to the above curing agent composition, wherein the bivalent tin based curing catalyst (c) is at least one species selected from the group consisting of tin octylate, tin naphthenate, tin stearate and tin Versatate.

A second embodiment of the invention relates to a two-pack type curable composition which hardens when a base resin composition (A) comprising a curable organic polymer (d) having in its molecule a functional group crosslinkable by a reaction catalyzed by a bivalent tin based curing catalyst (c), an epoxy group-containing silane compound (f) and an epoxy compound (g) is mixed with the curing agent composition (B) of the first embodiment of the invention.

As a preferred embodiment, it relates to the above two-pack type curable composition, wherein the curable organic polymer (d) is an organic polymer having a reactive silicon group.

Best Mode for Carrying Out the Invention

Firstly, the curing agent composition (solution B) for two-pack type curable composition use as the first embodiment of the invention is described in the following.

The hydrolyzable silyl group-containing compound (a) is a compound having one or more hydrolyzable silyl groups in its molecule, which is added to the composition for the purpose of expressing adhesiveness provision, dispersion, compatibility, weather resistance provision and the like desired actions.

The hydrolyzable silyl group is a group which has a hydrolyzable group bonded to a silicon atom and can be crosslinked by forming a siloxane bond. Its typical example is a group represented by a general formula (1):

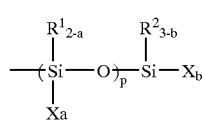

(1)

(wherein each of $R^1$ and $R^2$ represents an alkyl group having from 1 to 20 carbon atoms, a cycloalkyl group having from 3 to 20 carbon atoms, an aryl group having from 6 to 20 carbon atoms, an aralkyl group having from 7 to 20 carbon atoms or a triorganosiloxy group represented by $R^3{}_3SiO$— ($R^3$ is the same alkyl group, aryl group, cycloalkyl group or aralkyl group of $R^1$ and $R^2$, and the three $R^3$ groups may be the same or different from one another) wherein when two or more of $R^1$ or $R^2$ are present, they may be the same or different from one another, X represents a hydrolyzable group wherein when two or more of X are present, they may be the same or different from one another, a is 0, 1 or 2, b is 0, 1, 2 or 3, a in the p numbers of a group represented by a general formula (2):

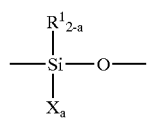

(2)

is not necessarily the same, and p is an integer of from 0 to 19, with the proviso that (total of a)+b≧1 is satisfied).

The hydrolyzable group represented by X is not particularly limited, and it may be any conventionally known hydrolyzable group. Its illustrative examples include hydrogen atom, halogen atom, alkoxy group, acyloxy group, ketoximate group, amino group, amido group, acid amido group, aminoxy group, mercapto group, alkenyloxy group and the like. Among them, hydrogen atom, alkoxy group, acyloxy group, ketoximate group, amino group, amido group, aminoxy group, mercapto group and alkenyloxy group are preferable, and alkoxy group is particularly preferable from the viewpoint of mild hydrolyzing ability and easy handling.

The hydrolyzable group and hydroxyl group can be bonded to a silicon atom within the range of from 1 to 3, and (total of a)+b is preferably within the range of from 1 to 5. When two or more of the hydrolyzable group and hydroxyl group are bonded to a reactive silicon group, they may be the same or different from one another.

The silicon atom which forms the hydrolyzable silyl group may be one or two or more, but may be approximately 20 in the case of the silicon atoms connected by siloxane bond and the like.

In this connection, a hydrolyzable silyl group represented by a general formula (3):

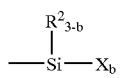
(3)

(wherein $R^2$, X and b are as defined in the foregoing) is desirable from the viewpoint of easy availability.

Also, illustrative examples of $R^1$ and $R^2$ in the general formulae (2) and (3) include an alkyl group such as methyl group or ethyl group, a cycloalkyl group such as cyclohexyl group, an aryl group such as phenyl group, an aralkyl group such as benzyl group and a triorganosiloxy group represented by $R^3{}_3SiO$—wherein $R^3$ is methyl group, phenyl group or the like. Among these groups, methyl group is particularly preferable.

More illustrative examples of the hydrolyzable silyl group include trimethoxysilyl group, triethoxysilyl group, triisopropoxysilyl group, dimethoxymethylsilyl group, diethoxymethylsilyl group and diisopropoxymethylsilyl group.

As the hydrolyzable silyl group-containing compound (a), a compound which also contains other reactive group in its molecule is desirable, because certain actions on the base resin component, curing agent component, substrate surface and the like can be expected when it is used by mixing with the base resin, and a compound generally used as a silane coupling agent can be used as such a compound.

Illustrative examples of such a silane coupling agent include amino group-containing silane compounds; mercapto group-containing silanes such as γ-mercaptopropyltrimethoxysilane and γ-mercaptopropyidimethoxysilane; vinyl type unsaturated group-containg silanes such as vinyltrimethoxysilane, γ-methacryloyloxypropyltrimethoxysilane and γ-acryloyloxypropylmethyidimethoxysilane; chlorine atom-containing silanes such as γ-chloropropyltrirmethoxysilane; isocyanate-containing silanes such as γ-isocyanatepropyltriethoxysilane and γ-isocyanatepropylmethoxysilane; and hydrosilanes such as methyldimethoxysilane, trimethoxysilane and melhyldiethoxysilane, though not limited thereto. Among these compound, an aminoalkyl group-containing silane compound (e) is preferable from the viewpoint of adhesiveness provision.

The aminoalkyl group-containing silane compound (e) may be any compound which has an aminoalkyl group and a hydrolyzable silyl group in its molecule, and its illustrative examples include γ-aminopropyltrimethoxysilane, γ-aminopropyltriethoxysilane, γ-aminopropylmethyidimethoxysilane, γ-aminopropylmethyidiethoxysilane, N-(β-aminoethyl)-γ-aminopropyltrimethoxysilane, N-(β-aminoethyl)γ-aminopropyltrimethoxysilane, N-(β-aminoethyl)-γ-aminopropyltriethoxysilane, N-(β-aminoethyl)-γ-aminopropylmethyldimethoxysilane, N-(β-aminoethyl)-γ-aminopropylmethyldiethoxysilane, 1,3-diaminoisopropyltrimethoxysilane and the like, but not limited thereto and generally used aminoalkyl group-containing silane compounds can be used. These aminoalkyl group-containing silane compounds may be used alone or as a mixture of two or more.

Among these aminoalkyl group-containing silane compounds (e), γ-aminopropylmethyldimethoxysilane, N-(β-aminoethyl)-γ-aminopropylmethyltriniethoxysilane, N-(β-aminoethyl)-γ-aminopropylmethyidimethoxysilane and the like can be cited as more preferred examples from the viewpoint of easy availability. A compound which contains two or more amino groups is particularly desirable because of its ability to generate high adhesiveness.

In addition, the aminoalkyl group-containing silane compound (e) and other silane coupling agent maybe jointly used as the hydrolyzable silyl group-containing compound (a) within such a range that the object of the invention is not spoiled. Illustratively, it is desirable to jointly use vinyltrimethoxysilane as a dehydrating agent for improving storage stability.

The non-phthalic acid ester based plasticizer (b) of the invention may be any compound which contains absolutely no phthalic acid ester structure in its molecule, that deactivates the bivalent tin based curing catalyst (c) in the coexistence of the hydrolyzable silyl group-containing compound (a), and which can facilitate mixing with the base resin by controlling volume and viscosity of the curing agent. Examples of such a compound include aliphatic dibasic acid esters such as dioctyl adipate, isodecyl succinate and dibutyl sebacate; glycol esters such as diethylene glycol dibenzoate and pentaerythritol ester; aliphatic esters such as butyl oleate and methyl acetylricinoleate; phosphoric acid esters such as tricresyl phosphate, trioctyl phosphate and octyldiphenyl phosphate; epoxy plasticizers such as epoxidated soybean oil, epoxidated linseed oil and benzylepoxy stearate; ester based plasticizers such as polyesters of dibasic acid with diatomic alcohol; polyether based plasticizers such as polypropylene glycol and derivatives thereof; polystyrenes such as poly-α-methylstyrene and polystyrene; hydrocarbon based plasticizers such as polybutadiene, polychloroprene, polyisoprene, polyisobutene, paraffin based hydrocarbon, naphthene based hydrocarbon and paraffin-naphthene based hydrocarbon; and butadiene-acrylonitrile copolymer, chlorinated paraffins and the like plasticizers, which can be optionally used alone or as a mixture of two or more. Among these compounds, non-ester based plasticizers which do not contain ester bond in its molecule, including polyether based plasticizers such as polypropylene glycol and derivatives thereof; polystyrenes such as poly-α-methylstyrene and polystyrene; hydrocarbon based plasticizers such as polybutadiene, butadiene-acrylonitrile copolymer, polychloroprene, polyisoprene, polyisobutene and paraffin and chlorinated paraffins, are desirable from the viewpoint of hydrolysis resistance. Particularly, polyether based plasticizers such as polypropylene glycol and derivatives thereof and hydrocarbon based plasticizers such as polyisobutene and paraffin, which do not contain unsaturated bond in the polymer main chain, are desirable from the viewpoint of weather resistance. Also, it is desirable from the paint staining point of view to use a polyoxyalkylene as a polyether based plasticizer, in which an organic group is introduced into 50 percent or more of the molecular chain terminus of a polyoxyalkylene polyol. In addition, an aryl group terminal polyoxypropylene in which an aryl group is introduced as the organic group into 80 percent or more of the molecular chain terminus is particularly desirable from the viewpoint of mortar slabs waterproof adhesiveness.

Also, a compound having relatively small molecular weight can be used as the non-phthalic acid ester based plasticizer (b) within a range which does not spoil the object of the invention, and its examples include toluene, xylene and the like aromatic hydrocarbon solvents; ethyl acetate, butyl acetate, amyl acetate, cellosolve acetate and the like ester solvents; and methyl ethyl ketone, methyl isobutyl ketone and the like ketone solvents.

In addition, the plasticizer can be used jointly with a filler, and volume of the curing agent can be further enlarged and its viscosity can be controlled by the addition of the filler.

Regarding the bivalent tin based curing catalyst (c) to be used in the invention, any bivalent tin based curing catalyst can be used, with the proviso that it can accelerate reaction of the reactive group of the curable organic polymer (d) which is a base resin component of the two-pack curable composition and has in its molecule a functional group crosslinkable by a reaction, and examples of such a curing catalyst include tin octylate, tin naphthenate, tin stearate and tin Versatate, though not limited thereto. Also, these curing catalysts may be used alone or as a mixture of two or more. In addition, joint use of an amine based compound is desirable from the viewpoint of hardenability. Examples of such a amine based compound, though not limited thereto, include butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5,4,0)undecene-7 (DBU) and the like amine based compounds or salts thereof with carboxylic acid and the like; a low molecular weight polyamide resin obtained from excess polyamine and a polybasic acid; and a reaction product of excess polyamine with an epoxy compound.

Also, because the curing speed can be controlled easily, a joint use system of tin dioctylate and laurylamine is preferable, and particularly for obtaining sufficient curing speed, it is preferable to use from 0.5 to 10 parts by weight of dioctylate and from 0.1 to 10 parts by weight laurylamine, based on 100 parts by weight of the curable organic polymer in the base resin.

In addition, when the curable organic polymer (d) to be used in the base resin requires moisture for the crosslinking reaction, the curable organic polymer (d) can be used as the non-phthalic acid ester based plasticizer (b) of the invention, by sealing preservation of the curing agent composition after its dehydration.

Regarding the method for selecting a desirable illustrative combination of the hydrolyzable silyl group-containing compound (a), non-phthalic acid ester based plasticizer (b) and bivalent tin based curing catalyst (c), $^{119}$Sn-NMR is measured before and after 4 weeks of storage of a liquid in which these three components are mixed at a mixing ratio to be used as a curing agent, under sealing at 50° C., and a combination having no substantial changes in the Sn peak, such as changes in the chemical shift and sharp decrease in the integrated intensity, is selected and used.

Also, according to the curing agent of the invention, a curing catalyst other than the bivalent tin based curing catalyst (c) can be jointly used within such a range that effects of the invention are not spoiled. Examples of such a catalyst include tetrabutyl titanate, tetrapropyl titanate, tetraisopropyl titanate, titanium tetraacetylacetonate and the like titanic acid esters; dibutyltin dilaurate, dibutyltin maleate, dibutyltin diacetate, a reaction product of dibutyltin oxide with a phthalic acid ester, dibutyltin diacetylacetonate and the like organic tin compounds; aluminum trisacetylacetonate, aluminum trisethylacetoacetate, dipropoxyaluminum ethylacetoacetate and the like organic aluminum compounds; reaction products of bismuth-tris(2-ethylhexoate), bismuth-tris(2-neodecanoate) and the like bismuth salts with an organic carboxylic acid or organic amine; zirconium tetraacetylacetonate, titanium tetraacetylacetonate and the like chelate compounds; lead octylate and the like organic lead compounds; iron naphthenate and the like organic iron compounds; and organic vanadium compound and the like.

The curing agent of the invention contains the hydrolyzable silyl group-containing compound (a), non-phthalic acid ester based plasticizer (b) and bivalent tin based curing catalyst (c) as essential components, and it is desirable that the hydrolyzable silyl group-containing compound (a) is used at a mixing ratio of from 0.01 to 100 parts by weight based on 1 part by weight of tin contained in the bivalent tin based curing catalyst (c). The amount if less than 0.01 part by weight would bear no sufficient adhesiveness providing effect and if exceeding 100 parts by weight would produce no proportionally improved adhesiveness providing effect but rather be disadvantageous from the economical point of view.

Also, it is desirable that the adding amount is 0.1 part by weight or more in view of the adhesiveness providing effect of the hydrolyzable silyl group-containing compound (a). In addition, it is desirable that the adding amount is 1 part by weight or more for adhering to mortar slabs or the like hardly adhesive substrate. In the same manner, the non-phthalic acid ester based plasticizer (b) is preferably within the range of from 1 to 1,000 parts by weight. When the amount is less than 1 part by weight, the viscosity decreasing and quantity increasing effects by the addition of the plasticizer are small, and extending by the addition of a filler also becomes difficult. On the other hand, the amount exceeding 1,000 parts by weight is not desirable, because the catalyst concentration becomes to low.

As occasion demands, the curing agent of the invention may be blended with various additives other than the above, such as a filler, an epoxy curing agent, a sagging preventing agent, a coloring agent, a reinforcing resin, a storage stability improving agent, an antioxidant, an ultraviolet ray absorbent, an ozone deterioration preventing agent, a light stabilizing agent, an amine based radical chain polymerization inhibitor, a phosphorus based peroxide decomposing agent, a lubricant, a pigment, a foaming agent and the like.

Useful examples of the filler include fume silica, precipitated silica, silicic anhydride, hydrated silicic acid, carbon black and the like reinforcing filler; and calcium carbonate, magnesium carbonate, diatomaceous earth, baked clay, clay, talc, kaolin, titanium oxide, bentonite, organic bentonite, ferric oxide, zinc oxide, activated zinc flower, glass balloon, shirasu balloon, organic balloon, organic fiber, inorganic fiber and the like fillers.

When it is desirable to obtain a curing agent having high viscosity by the use of these fillers, a good result can be obtained by the use of a filler selected mainly from fume silica, precipitated silica, silicic anhydride, hydrated silicic acid and carbon black, surface-treated fine calcium carbonate, baked clay, clay and activated zinc flower, in an amount of from 1 to 300 parts by weight based on 100 parts by weight of the non-phthalic acid ester based plasticizer (b). Also, when a curing agent having low viscosity and large volume is desired, a good result can be obtained by the use of a filler selected mainly from titanium oxide, calcium carbonate, magnesium carbonate, talc, ferric oxide, zinc oxide and shirasu balloon, in an amount of from 5 to 500 parts by weight based on 100 parts by weight of the plasticizer. As a matter of course, these fillers may be used alone or as a mixture of two or more.

Also, amine based compounds and ketimine compounds are included in the epoxy resin curing agent, and the amine based compounds described in the foregoing can be used.

As the ketimine compounds, compounds represented by the following general formula (4):

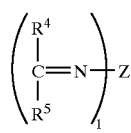

(4)

(wherein $R^4$ and $R^5$ are each independently hydrogen atom, an alkyl group having from 1 to 6 carbon atoms or phenyl group, Z is an organic group, and 1 is 1, 2 or 3) can be exemplified, which can be obtained by a condensation reaction of an amine based compound with a carbonyl compound.

Known amine based compound and carbonyl compound can be used in the synthesis of ketimine compound, and useful examples of the amine based compound include ethylenediamine, propylene diamine, trimethylenediamine, tetramethylenediamine, 1,3-diaminobutane, 2,3-diaminobutane, pentamethylenediamine, 2,4-diaminopentane, hexamethylenediamine, p-phenylenediamin, p,p'-biphenylenediamine or the like diamine; 1,2,3-triaminopropane, triaminobenzene, tris(2-aminoethyl)amine, tetra(aminomethyl)methane or the like polyvalent amine; diethylenetriamine, triethylenetriamine, tetraethylenepentamine or the like polyalkylenepolyamine; a polyoxyalkylene based polyamine; and γ-aminopropyltriethoxysilane, N-(β-aminoethyl)-γ-aminopropyltrimethoxysilane, N-(β-aminoethyl)-γ-aminopropylmethyldimethoxysilane or the like amino group-containing silane compound. Also, useful examples of the carbonyl compound include acetaldehyde, propionaldehyde, n-butylaldehyde, isobutylaldehyde, diethylacetoaldehyde, glyoxal, benzaldehyde and the like aldehydes; cyclopentanone, trimethylcyclopentanone, cyclohexanone, trimethylcyclohexanone and the like cyclic ketones; acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone and the like aliphatic ketones; and methyl acetylacetoneacetoacetate, ethyl acetoacetate, dimethyl malonate, diethyl malonate, methylethyl malonate, dibenzoylmethane and the like β-dicarbonyl compounds.

When imino group is present in ketimine, the imino group may be reacted with styrene oxide; butylglycidyl ether, arylglycidyl ether and the like glycidyl ethers; or glycidyl esters. These ketimine compounds may be used alone or as a mixture of two or more.

It is desirable from easy weighing point of view that the curing agent of the invention is used in such a manner that the base resin:curing agent weight ratio is adjusted to range of from 100:4 to 100:200 when it is mixed with the base resin. It is more desirable that the weight ratio is adjusted to a range of from 100:10 to 100:150, because uniform mixing can be made easily.

Next, the base resin (solution A) as another component of the two-pack type curable composition of the second embodiment of the invention is described in the following.

According to the invention, organic polymers having hydroxyl group can be exemplified as the curable organic polymer (d) having in its molecule a functional group crosslinkable by a reaction catalyzed by the bivalent tin based curing catalyst (c), when an organic polymer having reactive silicon group, an organic polymer having isocyanate group or a polyisocyanate compound is used as the curing agent.

The principal chain nucleus of these organic polymers is not particularly limited, and those which have various principal chain nuclei can be used. Their illustrative examples include polyoxyalkylene copolymers such as polyoxyethylene, polyoxypropylene, polyoxybutylene, polyoxytetramethylene, polyoxyethylene-polyoxypropylene copolymer and polyoxypropylene-polyoxybutylene copolymer; hydrocarbon based polymers such as ethylene-propylene based copolymer, polyisobutylene, copolymer of isobutylene with isoprene or the like, polychloroprene, polyisoprene, copolymer of isoprene or butadiene with acrylonitrile and/or styrene or the like, polybutadiene, copolymer of isoprene or butadiene with acrylonitrile and styrene or the like and hydrogenated polyolefin based polymers obtained by hydrogenating these polyolefin based polymers; polyester based polymers which are obtained by condensation of-adipic acid and the like dibasic acids with glycol or ring-opening polymerization of lactones; acrylic acid ester based polymers such as polyacrylic acid esters obtained by radical polymerization of ethyl acrylate, butyl acrylate and the like monomers and acrylic acid ester copolymers of ethyl acrylate, butyl acrylate and the like acrylic acid esters with vinyl acetate, acrylonitrile, methyl methacrylate, styrene and the like; graft polymers obtained by polymerizing vinyl monomer in the organic polymers; polysulfide based polymers; polyamide based polymers such as nylon 6 obtained by ring-opening polymerization of ε-caprolactam, nylon 6·6 obtained by condensation polymerization of hexamethylenediamine with adipic acid, nylon 6·10 obtained by condensation polymerization of hexamethylene diamine with sebacic acid, nylon 11 obtained by condensation polymerization of ε-aminoundecanoic acid, nylon 12 obtained by ring-opening polymerization of ε-aminolaurolactam and copolymer nylon having two or more components of these nylons; for example, polycarbonate based polymers produced by condensation polymerization from bisphenol A and carbonyl chloride and diallyl phthalate based polymers. Among polymers having these principal chain nuclei, a polyester based polymer, an acrylic acid ester based polymer, an acrylic acid ester based copolymer, a polyoxyalkylene based polymer, a hydrocarbon based polymer, a polycarbonate based polymer and the like are desirable because of their easy obtainment and production.

In addition, polyisobutylene, hydrogenated polyisoprene, hydrogenated polybutadiene and the like saturated hydrocarbon based polymers and a polyoxyalkylene based polymer essentially having a repeating unit represented by a general formula (5):

(5)

(wherein $R^6$ is a bivalent organic group, preferably a straight- or branched-chain alkylene group having from 1 to 14 carbon atoms) are particularly preferable, because they have relatively low glass transition temperature and the obtained hardened product shows excellent cold resistance.

Group $R^6$ in the general formula (5) is preferably a straight- or branched-chain alkylene group having from 1 to 14, more preferably from 2 to 4, carbon atoms. The following structures

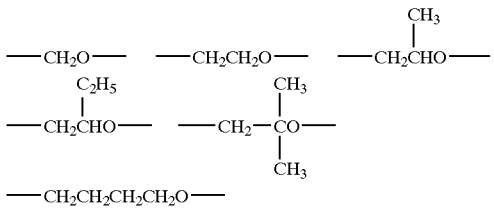

can be cited as illustrative examples of the repeating unit represented by the general formula (5). The principal chain nucleus of the polyoxyalkylene based polymer may be composed of only one type of repeating unit or two or more types of repeating units. Particularly, when used in sealants and the like, those which are comprised of a polymer having a propylene oxide polymer as the main component are desirable, because they are amorphous and have relatively low viscosity.

Examples of the polyalkylene based polymer synthesizing method, though not particularly limited, include a polymerization method which uses an alkali catalyst such as KOH, a polymerization method which uses an organic aluminum-porphyrin complex catalyst obtained by allowing an organic aluminum compound to react with porphyrin, described for example in JP-A-61-215623 and a polymerization method which uses a double metal cyanide complex catalyst, described for example in JP-B-46-27250 (the term "JP-B" as used herein means an "examined Japanese patent publication"), JP-B-59-15336, U.S. Pat. No. 3278457, U.S. Pat. No. 3278458, U.S. Pat. No. 3278459, U.S. Pat. No. 3427256, U.S. Pat. No. 3427334 and U.S. Pat. No. 3427335.

The principal chain nucleus of the polyoxyalkylene based polymer may contain a urethane bond component and the like other components within such a range that they do not considerably spoil effects of the invention.

Though the urethane bond component is not particularly limited, its examples include those which are obtained by the reaction of a polyisocyanate compound such as toluene (tolylene) diisocyanate, diphenylmethane diisocyanate, xylylene diisocyanate or the like aromatic polyisocyanate; or isophorone duisocyanate, hexamethylene diisocyanate or the like aliphatic polyisocyanate, with a polyol having the repeating unit of general formula (5).

The reactive silicon group contained in the reactive silicon group-containing organic polymer to be used as the curable organic polymer (d) is a group which has a hydroxyl group or hydrolyzable group bonded to a silicon atom and can be crosslinked by forming a siloxane bond by a reaction catalyzed by the bivalent tin based curing catalyst (c). Its typical example is a triorganosiloxy group represented by a general formula (6):

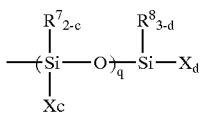

(6)

(wherein each of $R^7$ and $R^8$ represents an alkyl group having from 1 to 20 carbon atoms, a cycloalkyl group having from 3 to 20 carbon atoms, an aryl group having from 6 to 20 carbon atoms, an aralkyl group having from 7 to 20 carbon atoms or a triorganosiloxy group represented by $R^9{}_3SiO$—

($R^9$ is the same alkyl group, aryl group, cycloalkyl group or aralkyl group of $R^7$ and $R^8$, and the three $R^9$ groups may be the same or different from one another) wherein when two or more of $R^7$ or $R^8$ are present, they may be the same or different from one another, X represents hydroxyl group or a hydrolyzable group wherein when two or more of X are present, they may be the same or different from one another, c is 0, 1 or 2, d is 0, 1, 2 or 3, c in the q numbers of a group represented by a general formula (7):

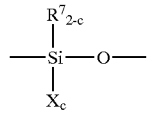

(7)

is not necessarily the same, and q is an integer of from 0 to 19, with the proviso that (total of c)+d≧1 is satisfied).

The hydrolyzable group represented by X is not particularly limited and may be any conventionally known hydrolyzable group. Its illustrative examples include hydrogen atom, halogen atom, alkoxy group, acyloxy group, ketoximate group, amino group, amido group, acid amido group, aminoxy group, mercapto group, alkenyloxy group and the like. Among these groups, hydrogen atom, alkoxy group, acyloxy group, ketoximate group, amino group, amido group, aminoxy group, mercapto group and alkenyloxy group are preferable, and alkoxy group is particularly preferable from the viewpoint of easy handling due to mild hydrolyzing ability.

The hydrolyzable group and hydroxyl group can be bonded to one silicon atom within the range of from 1 to 3, and (total of c)+d is preferably within the range of from 1 to 5. When two or more of the hydrolyzable group and hydroxyl group are bonded to a reactive silicon group, they may be the same or different from one another.

The silicon atom which forms the reactive silicon group may be one or two or more, but may be approximately 20 in the case of the silicon atoms connected by siloxane bond and the like.

In this connection, a reactive silicon group represented by a general formula (8):

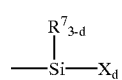

(8)

(wherein $R^8$, X and d are as defined in the foregoing) is desirable from the viewpoint of easy availability.

Also, illustrative examples of $R^7$ and $R^8$ in the general formulae (7) and (8) include an alkyl group such as methyl group or ethyl group, a cycloalkyl group such as cyclohexyl group, an aryl group such as phenyl group, an aralkyl group such as benzyl group and a triorganosiloxy group represented by $R^9{}_3SiO$—wherein $R^9$ is methyl group, phenyl group or the like. Among these groups, methyl group is particularly preferable.

More illustrative examples of the reactive silicon group include trimethoxysilyl group, triethoxysilyl group, triisopropoxysilyl group, dimethoxymethylsilyl group, diethoxymethylsilyl group and diisopropoxymethylsilyl group.

The reactive silicon group can be present in the principal chain or side chain or both of them, but it may be present preferably in the side chain terminus.

Introduction of the reactive silicon group can be carried out by a known method. That is, the following methods can be exemplified.

(a) An organic polymer containing an unsaturated group is obtained by allowing an organic polymer having hydroxyl group or the like functional group in its molecule to react with an organic compound having an active group which shows reactivity with the functional group and an unsaturated group. Alternatively, an unsaturated group-containing organic polymer is obtained by copolymerization with an unsaturated group-containing epoxy compound. Thereafter, the thus obtained reaction product is allowed to react with a hydrosilane having a reactive silicon group to effect its hydrosilylation.

(b) An unsaturated group-containing organic polymer obtained in the same manner as the method (a) is allowed to react with mercapto group and a reactive silicon group.

(c) An organic polymer having hydroxyl group, epoxy group, isocyanate group or the like functional group in its molecule is allowed to react with a compound having a functional group and a reactive silicon group which show reactivity with the functional group. Preferred among these methods are the method of (a) or a variation of the method of (c) in which a polymer having hydroxyl group on its terminus is allowed to react with a compound having isocyanate group and a reactive silicon group.

The organic polymer having a reactive silicon group is either straight- or branched-chain and has a number average molecular weight of approximately from 500 to 50,000, preferably from 1,000 to 30,000. It is desirable that at least 1 in average, preferably from 1.1 to 5, of the reactive group to be contained is present in one molecule of the polymer. The number of reactive group contained in the molecule if less than 1 in average would entail insufficient hardenability and if too large would show insufficient mechanical characteristics due to too dense network structure.

Though not particularly limited, illustrative examples of the organic polymer having reactive silicon group include those which are proposed for example in JP-B-45-36319, JP-B-46-12154, JP-A-50-156599, JP-A-54-6096, JP-A-55-13767, JP-A-55-13468, JP-A-57-164123, JP-B-3-2450, U.S. Pat. No. 3632557, U.S. Pat. No. 4345053, U.S. Pat. No. 4366307 and U.S. Pat. No. 4960844 and polyoxyalkylene based polymers having high molecular weight and narrow molecular weight distribution, namely a number average molecular weight of 6,000 or more and a Mw/Mn value of 1.6 or less, proposed in JP-A-61-197631, JP-A-61-215622, JP-A-61-215623 and JP-A-61-218632.

These organic polymers having reactive silicon group may be used alone or as a mixture of two or more. In addition, an organic polymer prepared by blending with a vinyl based polymer having reactive silicon group can also be used. Methods for the production of the organic polymer prepared by blending with a vinyl based polymer having reactive silicon group are proposed for example in JP-A-59-122541, JP-A-63-112642 and JP-A-6-172631. In a preferred illustrative example of the production method, an organic polymer having a reactive silicon group is blended with a copolymer comprised of an acrylic ester monomer unit and/or methacrylic ester monomer unit containing an alkyl group having from 1 to 8 carbon atoms, in which it has a reactive silicon group and its molecular chain is substantially represented by the following general formula (9):

(wherein $R^{10}$ is an alkyl group having from 1 to 8 carbon atoms and $R^{11}$ is hydrogen atom or methyl group), and an acrylic ester monomer unit and/or methacrylic ester monomer unit containing an alkyl group having 10 or more carbon atoms, substantially represented by the following general formula (10):

(wherein $R^{10}$ is as defined in the above and $R^{12}$ is an alkyl group having 10 or more carbon atoms).

Examples of $R^{11}$ in the general formula (9) include methyl group, ethyl group, propyl group, n-butyl group, t-butyl group, 2-ethylhexyl group and the like alkyl groups having from 1 to 8, preferably from 1 to 4, more preferably 1 or 2, carbon atoms. In this connection, the alkyl groups of $R^{11}$ may be alone or a mixture of two or more.

Examples of $R^{12}$ in the general formula (10) include lauryl group, tridecyl group, cetyl group, stearyl group, behenyl group and the like alkyl groups having 10 or more, generally from 10 to 30, preferably from 10 to 20, carbon atoms. In this connection, the alkyl groups of $R^{12}$ may be alone or a mixture of two or more similar to the case of $R^{11}$.

Molecular chain of the vinyl based copolymer is substantially comprised of the monomer units of formulae (9) and (10), wherein the term "substantially" means that total of the monomer units of formulae (9) and (10) existing in the copolymer exceeds 50% by weight. Total amount of the monomer units of formulae (9) and (10) is preferably 70% by weight or more.

Also, existing ratio of the monomer unit of formulae (9) to the monomer unit of formula (10) is preferably from 95:5 to 40:60, more preferably from 90:10 to 60:40, as weight ratio.

Examples of monomer units other than those of the formulae (9) and (10), which may be contained in the copolymer, include acrylic acids such as acrylic acid and methacrylic acid; monomers containing an amido group, such as acrylamide, methacrylamide, N-methylolacrylamide or N-methylolmethacrylamide, containing an epoxy group, such as glycidyl acrylate or glycidyl methacrylate, and containing an amino group, such as diethylaminoethyl acrylate, diethylaminoethyl methacrylate or aminoethylvinyl ether; and other monomer units derived from acrylonitrile, styrene, α-methylstyrene, alkylvinyl ether, vinyl chloride, vinyl acetate, vinyl propionate, ethylene and the like.

It is desirable that the copolymer has a number average molecular weight of from 500 to 100,000, from the viewpoint of easy handling.

The reactive silicon group contained in the copolymer is represented by a general formula (11):

(wherein each of $R^{13}$ and $R^{14}$ is a substituted or unsubstituted monovalent organic group having from 1 to 20 carbon atoms or a triorganosiloxy group (details on the organic group and triorganosiloxy group are the same as the case of $R^7$ and $R^8$), X is hydroxyl group or different or same species of hydrolyzable group, e is an integer of 0, 1 or 2 and f is an integer of 0, 1, 2 or 3, which satisfy (total of e)+f≧1, and r is an integer of from 0 to 19). A reactive silicon group preferred from the economical and the like points of view is a group represented by a general formula (12):

(wherein $R^{14}$ and X are as defined in the foregoing, and f is an integer of 1, 2 or 3).

The number of reactive silicon group in the copolymer is preferably 1 or more, more preferably 1.1 or more, most preferably 1.5 or more in average, from the viewpoint of obtaining sufficient hardening ability.

Illustrative examples of the hydrolyzable group in formula (11) include halogen atom, hydrogen atom, alkoxy group, acyloxy group, ketoximate group, amino group, amido group, aminoxy group, mercapto group, alkenyloxy group and the like. Among them, methoxy group, ethoxy group or the like alkoxy group is preferable from the viewpoint of mild hydrolyzing ability.

Also, illustrative examples of $R^{13}$ and $R^{14}$ in the formula (11) include methyl group, ethyl group or the like alkyl group, cyclohexyl group or the like cycloalkyl group, phenyl group or the like aryl group and benzyl group or the like aralkyl group. In addition, the $R^{13}$ and $R^{14}$ may be a triorganosiloxy group represented by $R^{15}{}_3SiO$—($R^{15}$ is the same as the $R^{13}$). Among these groups, methyl group is particularly preferable.

Regarding the production method of the organic polymer prepared by blending with a vinyl based polymer having a reactive silicon functional group, a method cal also be used in which polymerization of a (meth)acrylic ester based monomer is carried out in the presence of an organic polymer having a reactive silicon group. This production method is illustratively disclosed for example in JP-A-59-78223, JP-A-59-168014, JP-A-60-228516 and JP-A-60-228517, though not limited thereto.

Regarding the organic based polymer having in its molecule isocyanate group as a functional group crosslinkable by a reaction catalyzed by the bivalent tin based curing catalyst (c), as another example of the curable organic polymer of the invention, a polymer may be used which is obtained by allowing an organic polymer having the organic based polymer as the principal chain nucleus and hydroxyl group, epoxy group, amino group or the like functional group in its molecule to react with a compound having a functional group and/or isocyanate group which shows reactivity with the functional group. Particularly, a urethane prepolymer having isocyanate group in its molecule, obtained by allowing an organic based polymer having hydroxyl group to react with a polyisocyanate compound in an excess amount for the hydroxyl group, is desirable because of its easy production. Examples of the polyisocyanate compound include tolylene diisocyanate (TDI), methylene diisocyanate (MDI), xylylene diisocyanate (XDI), isophorone diisocyanate (IPDI), hexamethylene diisocyanate (HMDI), tetramethylene diisocyanate (TMDI) and the like. In addition, their uretodione derivatives, isocyanurate derivatives, cyanurate derivatives or carbodiimide derivatives can also be used.

In addition, regarding the organic based polymer containing hydroxyl group, which, when the polyisocyanate compound is used as the curing agent, can be used as the curable organic polymer having in its molecule a functional group crosslinkable by a reaction catalyzed by the bivalent tin based curing catalyst (c) of the invention, a hydroxyl group-terminus polyoxyalkylene based polymer or a hydroxyl group-terminus polyester based polymer is desirable from the viewpoint of easy production. The hydroxyl group-terminus polyoxyalkylene based polymer is particularly desirable in view of alkali resistance of the resulting hardened product.

The epoxy group-containing silane compound (f) as one of the components necessary for providing adhesiveness in the invention is a compound which has an epoxy group and a hydrolyzable silyl group in its molecule and does not have a substituent group such as amino group that catalyzes hardening reaction of the curable organic polymer (d). Its illustrative examples include γ-glycidoxypropyltrimethoxysilane, γ-glycidoxypropyltriethoxysilane, γ-glycidoxypropylmethyldimethoxysilane and β-(3,4-epoxycyclohexyl)ethyltrimethoxysilane, but not limited thereto and generally used epoxy group-containing silane compounds can be used. These epoxy group-containing silane compounds may be used alone or as a mixture of two or more.

Among these epoxy group-containing silane compounds, γ-glycidoxypropyltrimethoxysilane is desirable particularly from the viewpoint of easy availability. Regarding its amount to be added, modulus becomes high when it is too large and adhesiveness is reduced when it is too small, so that the adding amount is preferably from 0.1 to 15 parts by weight, more preferably from 0.5 to 10 parts by weight, based on 100 parts by weight of the organic polymer (d).

Illustrative examples of the epoxy resin (g) as another component necessary for providing adhesiveness in the invention include an epichlorohydrin-bisphenol A type epoxy resin, an epichlorohydrin-bisphenol F type epoxy resin, a flame-retardant epoxy resin such as glycidyl ether of tetrabromobisphenol A, a novolak type epoxy resin, a glycidyl ether type epoxy resin of hydrogenated bisphenol A type epoxy resin bisphenol A propylene oxide addition product, a p-oxybenzoic acid glycidyl ether ester type epoxy resin, an m-aminophenol based epoxy resin, a diaminodiphenylmethane based epoxy resin, a urethane modified epoxy resin, various alicyclic epoxy resins, N,N-diglycidylanilin, N,N-diglycidyl-o-toluidine, triglycidyl isocyanurate, a polyalkylene glycol diglycidyl ether, a glycidyl ether of glycerol or the like polyhydric alcohol, a hydantoin type epoxy resin and an epoxidated product of a petroleum resin or the like unsaturated polymer, but not limited thereto and generally used epoxy resins can be used. These epoxy resins may be used alone or as a mixture of two or more.

Among these epoxy resins, particularly those which have at least two epoxy groups in one molecule are desirable from the viewpoint that they show high reactivity at the time of hardening and the hardened product easily forms three-dimensional network. Bisphenol A type epoxy resins or a novolak type epoxy resin can be cited as more preferable examples. Regarding the amount to be added, modulus becomes high when it is too large and adhesiveness is reduced when it is too small, so that the adding amount is preferably from 0.1 to 15 parts by weight, more preferably from 0.5 to 10 parts by weight, based on 100 parts by weight of the organic polymer (d).

Regarding the total adding amount of these components (f) and (g) of the base resin, modulus and cost become high when it is too large and adhesiveness and strength at rupture are reduced when it is too small, so that the adding amount is preferably from 0.5 to 20 parts by weight, more preferably from 1 to 15 parts by weight, based on 100 parts by weight of the organic polymer (d).

As occasion demands, the base resin of the curable resin composition of the invention may be blended with various additives other than the above, such as a filler, a plasticizer, a sagging preventing agent, a coloring agent, a silane coupling agent, an epoxy curing agent, a reinforcing resin, a storage stability improving agent, an antioxidant, an ultraviolet ray absorbent, a metal inactivating agent, an ozone deterioration preventing agent, a light stabilizing agent, an amine based radical chain polymerization inhibitor, a phosphorus based peroxide decomposing agent, a lubricant, a pigment, a foaming agent and the like.

Useful examples of the filler to be added to the base resin include fume silica, precipitated silica, silicic anhydride, hydrated silicic acid and carbon black and the like reinforcing fillers; and calcium carbonate, magnesium carbonate, diatomaceous earth, baked clay, clay, talc, kaolin, titanium oxide, bentonite, organic bentonite, ferric oxide, zinc oxide, activated zinc flower, glass balloon, shirasu balloon, organic balloon, organic fiber, inorganic fiber and the like fillers.

When it is desirable to obtain a hardened product having more high strength by the use of these fillers, a good result can be obtained by the use of a filler selected mainly from fume silica, precipitated silica, silicic anhydride, hydrated silicic acid and carbon black, surface-treated fine calcium carbonate, baked clay, clay and activated zinc flower, in an amount of from 1 to 500 parts by weight based on 100 parts by weight of the organic polymer (d). Also, when a hardened product having low strength and large elongation is desired, a good result can be obtained by the use of a filler selected mainly from titanium oxide, calcium carbonate, magnesium carbonate, talc, ferric oxide, zinc oxide and shirasu balloon, in an amount of from 5 to 500 parts by weight based on 100 parts by weight of the polymer. As a matter of course, these fillers may be used alone or as a mixture of two or more.

Examples of the plasticizer to be added to the base resin include phthalic acid esters such as diisodecyl phthalate, diundecyl phthalate, diisoundecyl phthalate, dioctyl phthalate, dibutyl phthalate and butylbenzyl phthalate; aliphatic dibasic acid esters such as dioctyl adipate, isodecyl succinate and dibutyl sebacate; glycol esters such as diethylene glycol dibenzoate and pentaerythritol ester; aliphatic esters such as butyl oleate and methyl acetylricinoleate; phosphoric acid esters such as tricresyl phosphate, trioctyl phosphate and octyldiphenyl phosphate; epoxy plasticizers such as epoxidated soybean oil, epoxidated linseed oil and benzyl epoxystearate; polyphthalic acid ester based plasticizers such as polyesters of dibasic acid with diatomic alcohol; polyether based plasticizers such as polypropylene glycol and derivatives thereof; polystyrenes such as poly-α-methylstyrene and polystyrene; and other plasticizers such as polybutadiene, butadiene-acrylonitrile copolymer, polychloroprene, polyisoprene, polyisobutene and chlorinated paraffins, which can be optionally used alone or as a mixture of two or more, and joint use of these plasticizers with a filler is effective, because elongation of the hardened product can be increased and a large amount of the filler can be mixed.

Examples of the sagging preventing agent include hydrogenated castor oil derivatives; polyamide wax; and calcium stearate, aluminum stearate, barium stearate and the like metal soaps, which may be optionally used as occasion demands depending on the using purpose and formulation of a filler, a reinforcing material and the like.

As the coloring agent, a conventionally used inorganic pigment, organic pigment, dyestuff or the like can be, used as occasion demands.

Illustrative examples of the silane coupling agent to be added to the base resin include mercapto group-containing silanes such as γ-mercaptopropyltrimethoxysilane and γ-mercaptopropyldimethoxysilane; vinyl type unsaturated group-containing silanes such as vinyltriethoxysilane, γ-methacryloyloxypropyltrimethoxysilane and γ-acryloyloxypropylmethyldimethoxysilane; chlorine atom-containing silanes such as γ-chloropropyltrimethoxysilane; isocyanate-containing silanes such as γ-isocyanatepropyltriethoxysilane and γ-isocyanatepropylmethyldimethoxysilane; and hydrosilanes such as methyldimethoxysilane, trimethoxysilane and methyldiethoxysilane, though not limited thereto.

As the epoxy resin curing agent to be added to the base resin, the compounds described in the foregoing can be used.

In this connection, a solvent may be added to the base resin composition for the workability improvement, viscosity reduction or the like purpose, and examples of the solvent to be used for this purpose include toluene, xylene and the like aromatic hydrocarbon solvents; ethyl acetate, butyl acetate, amyl acetate, cellosolve acetate and the like ester solvents; and methyl ethyl ketone, methyl isobutyl ketone and the like ketone solvents.

Regarding the method for preparing the two-pack type curable composition of the invention, there is no particular limitation except that the curing agent components and base resin components are not allowed to react with one another by mixing them in advance, and as an illustrative example of the base resin side, the epoxy group-containing silane compound (f), the epoxy resin (g) and other additives are added to the organic based polymer (d) and uniformly dispersed, by optionally adjusting stirring and the like conditions as occasion demands. Alternatively, a method in which respective components are mixed using a mixer, a roller or a kneader may be employed. Regarding the curing agent side, the hydrolyzable silyl group-containing compound (a), the non-phthalic acid ester based plasticizer (b), the bivalent tin based curing catalyst (c) and other additives are uniformly dispersed, by optionally adjusting stirring and the like conditions as occasion demands. Alternatively, a method in which respective components are mixed using a mixer, a roller or a kneader may be employed. Also, beforehand drying of the materials to be used, addition of a dehydrating agent, heating dehydration under a reduced pressure or the like dehydration step is desirable for the purpose of inhibiting increase in viscosity during production and storage of the curing agent. Also, it is particularly desirable to preserve the thus obtained curing agent having reduced water content to a substantially non-problematic level in a moisture proof sealed container, in order to inhibit increase in viscosity during its transportation and storage.

In addition, since the two-pack type curable composition of the invention hardens when the base resin is mixed with the curing agent, it is useful as an elastic sealing material in the field of buildings, public works and industrial applications and can also be used as a paint, an adhesive, an impregnating agent and a coating material.

EXAMPLES

The following describes the invention further in detail based on examples, though the invention is not limited thereto.

(Inventive Example 1)

<Curing Agent>

Tin octylate, laurylamine, N-(β-aminoethyl)-γ-aminopropyltrimethoxysilane (trade name: A-1120 (mfd. by Nippon Unicar)) as an amino group-containing silane compound, a dehydrating agent and a plasticizer and filler dried in advance were mixed in respective amounts shown in Table 1, and the mixture was thoroughly kneaded, passed three times through a small size three roller paint roll and then subjected to about 5 minutes of dehydration at 50° C. under a reduced pressure. The thus obtained curing agent for two-pack type curable composition use was sealed in a moisture proof container. Also, a liquid prepared by excluding the filler from the formulation shown in Table 1 and mixing the liquid components tin octylate, laurylamine, amino group-containing silane compound, vinyl group-containing silane compound and plasticizer was measured for its $^{119}$Sn-NMR before and after its 4 weeks of storage at 50° C. As the result, changes in the chemical shift of the Sn peak and decrease in the integrated intensity were not found.

TABLE 1

|  |  |  | Inventive Example | | | | | |
|---|---|---|---|---|---|---|---|---|
|  |  |  | 1 | 2 | 3 | 4 | 5 | 6 |
| Curing agent (solution B) | | | | | | | | |
| Bivalent tin catalyst | Tin octylate | | 3 | 3 | 3 | 3 | 3 | 3 |
|  | Laurylamine | | 0.3 | 0.3 | 0.3 | 0.3 | 0.3 | 0.3 |
| Tetravalent tin catalyst | Dibutyltin dilaurate | | | | | | | |
| Amino-containing silane compound | N-(β-aminoethyl)-γ-aminopropyltrimethoxysilane | | 2 | 2 | 2 | 2 | 2 | 2 |
| Dehydrating agent | Vinyltrimethoxysilane | | 0.2 | 0.2 | 0.2 | 0.2 | 0.2 | 0.2 |
| Plasticizer | Polypropylene glycol (average molecular weight = 3,000) | | 6.5 | | | | 6.5 | |
|  | Paraffin based plasticizer (Exxsol D-130) | | | 6.5 | | | | 6.5 |
|  | Polyoxyalkylene having reactive silicon group in the molecule | | | | 6.5 | | | |
|  | Allyl ether group-terminus polyoxyalkylene | | | | | 6.5 | | |
|  | Diisodecyl phthalate | | | | | | | |
| Filler | Precipitated calcium carbonate | | 20 | 20 | 20 | 20 | 20 | 20 |
| Base resin (solution A) | | | | | | | | |
| Curable organic based polymer (d) | Polyoxyalkylene having reactive silicon group in the molecule | | 100 | 100 | 93.5 | 100 | 100 | |
|  | Polyisobutylene having reactive silicon group in the molecule | | | | | | | 100 |
| Epoxy-containing silane compound | γ-Glycidoxypropyltrimethoxysilane | | 2 | 2 | 2 | 2 | 2 | 2 |
| Epoxy resin | Bisphenol A-epichlorohydrin type epoxy resin | | 1 | 1 | 1 | 1 | 1 | 1 |
| Mixing ratio* | Weight ratio (base resin:curing agent) | | 100:10 | 100:10 | 100:10 | 100:10 | 100:10 | 100:10 |
| Mixing ability** | Easiness for weighing and mixing | | + | + | + | + | + | + |
| Storage stability (surface curing time) | Initial (Before 50° C. × 4 weeks store) | Hr | 6 | 6 | 6 | 6 | 6 | 6 |
|  | After 50° C. × 4 weeks store | Hr | 6 | 6 | 6 | 6 | 6 | 6 |
| Adhesiveness after storage of curing agent (water resistance) | Substrate: plate glass | break mode | ++ | ++ | ++ | ++ | ++ | ++ |
|  | Substrate: aluminum alloy (anodic oxidation) | break mode | ++ | ++ | ++ | ++ | ++ | ++ |
|  | Substrate: mortar slabs | break mode | + | + | + | ++ | + | + |
| Elastic Recovery | 23° C., 100% elongation 24 hr. set, 1 hr after release | %*** | 94% | 95% | 94% | 94% | 95% | 95% |

*Base resin/curing agent mixing ratio
**Base resin/curing agent mixing ability
***Elastic recovery ratio <Base Resin>

To 100 parts by weight of a reactive silicon group-containing polyoxypropylene (number average molecular weight 18,000, Mw/Mn=1.5) which had been synthesized by the method described in Synthesis Example 1 of International Publication No. 91/13928 were added 70 parts by weight of precipitated calcium carbonate (average particle size: 0.07 μm, trade name: Ultra Pflex (mfd. by Pfizer)), 70 parts by weight of ground calcium carbonate (average particle size: 3.0 μm, trade name: Hubercarb Q3T (mfd. by Huber)), 60 parts by weight of DIDP (diisodecyl phthalate), 2 parts by weight of hydrogenated castor oil and γ-glycidoxypropyltrimethoxysilane (trade name: A-187 (mfd. by Nippon Unicar)) as an epoxy group-containing silane compound and bisphenol A-epichlorohydrin type epoxy resin (trade name: Epikote 828 (mfd. by Yuka-Shell Epoxy)) as an epoxy resin, both in respective amounts shown in Table 1, and the mixture was thoroughly kneaded and then passed three times through a small size three roller paint roll, thereby obtaining the base resin of two-pack type curable composition.

(Inventive Example 2)

<Curing Agent>

A curing agent was obtained by the same method of Inventive Example 1, except that 6.5 parts by weight of a paraffin based compound (Exxsol D-130, mfd. by Exxon Chemical) was used in the curing agent instead of the polypropylene glycol having a number average molecular weight of 3,000. Also, in the same manner as described in Inventive Example 1, the filler was excluded from the formulation shown in Table 1 and the remaining liquid components were mixed, and the resulting liquid was measured for its $^{119}$ Sn-NMR before and after its 4 weeks of storage at 50° C. As the result, changes in the chemical shift of the Sn peak and decrease in the integrated intensity were not found.

<Base Resin>

A base resin was obtained by the same method of Inventive Example 1, except that 100 parts by weight of polyoxypropylene having reactive silicon group in its molecule, which had been synthesized by the method described in Production Example 1 of JP-A-2-145674, was used as the curable organic polymer in the base resin.

(Inventive Example 3)

<Curing Agent>

A curing agent was obtained by the same method of Inventive Example 1, except that 6.5 parts by weight of the same polyoxypropylene having reactive silicon group in its molecule used in the base resin was used in the curing agent instead of the polypropylene glycol having a number average molecular weight of 3,000. Also, in the same manner as described in Inventive Example 1, the filler was excluded from the formulation shown in Table 1 and the remaining liquid components were mixed, and the resulting liquid was measured for its $^{119}$ Sn-NMR before and after its 4 weeks of storage at 50° C. As the result, changes in the chemical shift of the Sn peak and decrease in the integrated intensity were not found.

<Base Resin>

To 93.5 parts by weight of a reactive silicon group-containing polyoxypropylene which had been synthesized by the method described in Synthesis Example 1 of International Publication No. 91/13928 were added 70 parts by weight of precipitated calcium carbonate (average particle size: 0.07 μm), 70 parts by weight of ground calcium carbonate (average particle size: 3.0 μm), 66.5 parts by weight of DIDP (diisodecyl phthalate), 2 parts by weight of hydrogenated castor oil and the epoxy group-containing silane compound and epoxy resin, both in respective amounts shown in Table 1, and the mixture was thoroughly kneaded and then passed three times through a small size three roller paint roll, thereby obtaining the base resin of two-pack type curable composition.

(Inventive Example 4)

A curing agent was obtained by the same method of Inventive Example 1, except that 6.5 parts by weight of an allyl ether-terminus polyoxypropylene having a number average molecular weight of 10,000 in which allyl ether group was introduced into 97% of the termini was used in the curing agent instead of the polypropylene glycol having a number average molecular weight of 3,000. Also, in the same manner as described in Inventive Example 1, the filler was excluded from the formulation shown in Table 1 and the remaining liquid components were mixed, and the resulting liquid was measured for its $^{119}$ Sn-NMR before and after its 4 weeks of storage at 50° C. As the result, changes in the chemical shift of the Sn peak and decrease in the integrated intensity were not found.

(Inventive Example 5)

A base resin was obtained by the same method of Inventive Example 1, except that 100 parts by weight of polyoxypropylene having reactive silicon group in its molecule, which had been synthesized by the method described in Synthesis Example 1 of International Publication No. 91/13928, was used as the curable organic polymer in the base resin.

(Inventive Example 6)

A base resin was obtained by the same method of Inventive Example 1, except that 100 parts by weight of polyisobutylene having reactive silicon group in its molecule, which had been synthesized by the method described in Production Example 2 of JP-A-8-231758, was used as the curable organic polymer in the base resin, 60 parts by weight of a hydrocarbon based plasticizer (trade name: PS-32, mfd. by Idemitsu Kosan) was used as the plasticizer instead of DIDP and 2 parts by weight of ion exchange water was further added.

(Comparative Example 1)

A curing agent was obtained by the same method of Inventive Example 1, except that 6.5 parts by weight of phthalic ester based DIDP (diisodecyl phthalate) was used in the curing agent instead of the polypropylene glycol having a number average molecular weight of 3,000. Also, in the same manner as described in Inventive Example 1, the filler was excluded from the formulation shown in Table 1 and the remaining liquid components were mixed, and the resulting liquid was measured for its $^{119}$ Sn-NMR before and after its 4 weeks of storage at 50° C. As the result, it was confirmed that the Sn peak observed before the storage disappeared and clear peak was not found after the storage.

TABLE 2

|  |  | Comparative Example | | | | | | |
|---|---|---|---|---|---|---|---|---|
|  |  | 1 | 2 | 3 | 4 | 5 | 6 | 7 |
| Curing agent (solution B) | | | | | | | | |
| Bivalent tin catalyst | Tin octylate | 3 | 3 | 5 | 5 |  | 5 | 5 |
|  | Laurylamine | 0.3 | 0.3 | 0.4 | 0.4 |  | 0.4 | 0.4 |
| Tetravalent tin catalyst | Dibutyltin dilaurate |  |  |  |  | 5 |  |  |
| Amino-containing silane compound | N-(β-aminoethyl)-γ-aminopropyltrimethoxysilane | 2 |  | 2 | 2 | 2 | 2 | 2 |
| Dehydrating agent | Vinyltrimethoxysilane | 0.2 | 0.2 | 0.2 | 0.2 | 0.2 | 0.2 | 0.2 |
| Plasticizer | Polypropylene glycol (average molecular weight = 3,000) |  | 6.5 |  |  | 6.5 | 6.5 | 6.5 |
|  | Paraffin based plasticizer (Exxsol D-130) | | | | | | | |
|  | Polyoxyalkylene having reactive silicon group in the molecule | | | | | | | |
|  | Allyl ether group-terminus polyoxyalkylene | | | | | | | |
|  | Diisodecyl phthalate | 6.5 | | | | | | |
| Filler | Precipitated calcium carbonate | 20 | 20 |  | 20 | 20 | 20 | 20 |
| Base resin (solution A) | | | | | | | | |
| Curable organic based polymer (d) | Polyoxyalkylene having reactive silicon group in the molecule | 100 | 100 | 100 | 100 | 100 | 100 | 100 |
|  | Polyisobutylene having reactive silicon group in the molecule | | | | | | | |
| Epoxy-containing silane compound | γ-Glycidoxypropyltrimethoxysilane | 2 | 2 | 2 | 2 | 2 | 2 |  |
| Epoxy resin | Bisphenol A-epichlorohydrin type epoxy resin | 1 | 1 | 1 | 1 | 1 |  | 1 |
| Mixing ratio* | Weight ratio (base resin:curing agent) | 100:10 | 100:10 | 100:2.5 | 100:8 | 100:10 | 100:10 | 100:10 |
| Mixing ability** | Easiness for weighing and mixing | + | + | + | − | + | + | + |
| Storage stability (surface curing time) | Initial (Before 50° C. × 4 weeks store) | 5 | 6 | 6 | N.M. | 5 | 6 | 6 |
|  | After 50° C. × 4 weeks store Hr | 30 | 6 | 6 | N.M. | 5 | 6 | 6 |
| Adhesiveness after storage of curing agent (water resistance) | Substrate: plate glass — break mode | + | − | − | N.M. | ++ | + | + |
|  | Substrate: aluminum alloy (anodic oxidation) — break mode | + | − | − | N.M. | ++ | + | + |
|  | Substrate: mortar slabs — break mode | − | − | − | N.M. | + | − | − |
| Elastic Recovery | 23° C., 100% elongation 24 hr. set, 1 hr after release %*** | 95% | 95% | 85% | N.M. | 55% | 95% | 93% |

*Base resin/curing agent mixing ratio
**Base resin/curing agent mixing ability
***Elastic recovery ratio
N.D.: not detectable, N.M.: not measurable (Comparative Example 2)

A curing agent in which the amino group-containing silane compound was excluded from the curing agent composition of Inventive Example 1 was obtained by the same method of Inventive Example 1.

(Comparative Example 3)

A curing agent in which the plasticizer and filler were excluded from the curing agent composition of Inventive Example 1 was obtained by the same method of Inventive Example 1.

(Comparative Example 4)

An attempt was made to prepare a curing agent in which the plasticizer alone was excluded from the curing agent composition of Inventive Example 1, by the same method of Inventive Example 1, but it was unable to obtain a usable curing agent, because all of the liquid components were adsorbed by the filler and could not therefore be dispersed by the small size three roller paint roll.

(Comparative Example 5)

A curing agent was obtained by the same method of Inventive Example 1, except that dibutyltin dilaurate was used instead of tin octylate and laurylamine in the curing agent components.

(Comparative Example 6)

A base resin in which the epoxy resin was excluded from the base resin components of Inventive Example 1 was obtained by the same method of Inventive Example 3.

Comparative Example 7)

A base resin in which the epoxy group-containing silane compound was excluded from the base resin components of Inventive Example 1 was obtained by the same method of Inventive Example 3.

Before and after the 4 weeks of storage at 50° C., each of the thus obtained curing agents of Inventive Examples 1 to 6 and Comparative Examples 1 to 7 was mixed with the base resin at the weight ratio shown in Table 1 or 2 and poured into an ointment can cover, and its curing rate was evaluated at 23° C. and in 55% humidity. When the thin film-formed time was measured by lightly touching the composition surface and evaluated as the curing time, the curing agent of Comparative Example 1 in which diisodecyl phthalate was used as the plasticizer caused considerable delay of hardening as shown in Table 2, but, as shown in Table 1, the curing agents of Inventive Examples 1 to 6 showed markedly good storage stability without causing delay of hardening.

Also, using each of the curing agents after 4 weeks of storage at 50° C. and in accordance with the test method of ASTM C794, samples for testing adhesiveness for aluminum alloy, plate glass and mortar slabs were prepared, subjected to 2 weeks of aging at 23° C. and in 55% humidity, soaked in water at 23° C. for 7 days and then taken out from the water to immediately carry out hand peeling evaluation. The results were judged by a break mode, and a cohesive failure ratio of from 90 to 100% was expressed by ++, from 75 to 90% by + and from 0 to 75% by –. In this case, in order to make the evaluation conditions more strictly, the adhesiveness testing samples were prepared without coating a primer on the adhesion surface. As a result, while Inventive Examples 1 to 6 showed good adhesiveness, Comparative Examples 2, 6 and 7 which did not contain one of the amino group-containing silane compound, epoxy group-containing silane compound and epoxy resin in the composition showed insufficient adhesiveness. Also, since the amount of components added to the base resin was extremely small in the curing agent of Comparative Example 3 which did not contain the plasticizer and filler in the curing agent, uniform mixing was insufficient and portions of insufficient hardening was observed. In addition, mortar slabs adhesiveness was particularly excellent in Inventive Example 4 in which an allyl ether group-terminus polyoxypropylene was used as the plasticizer in the curing agent.

In addition, respective base resin and curing agent were mixed, poured into a mold and subjected to aging and hardening at 23° C. in 55% humidity for 3 days and then at 50° C. in 55% humidity for 4 days. Thereafter, a JIS No. 3 dumbbell piece was cut out and bench marks were drawn at 2 cm intervals. When this was set under conditions of 23° C., 100% elongation and 24 hours and then the elastic recovery ratio was measured 1 hour after released of the set, the hardened products of Inventive Examples 1 to 6 in which a bivalent tin based catalyst was used showed markedly excellent recoverability, while the hardened product of Comparative Example 5 in which a tetravalent tin based catalyst alone was used showed insufficient recoverability.

INDUSTRIAL APPLICABILITY

The curing agent for two-pack type curable composition use of the invention obtained in this manner is easy to mix at the time of its use and has excellent storage stability.

In addition, the two-pack type curable composition of the invention hardens by mixing the base resin and curing agent and shows excellent recoverability and adhesiveness to substrate.

What is claimed is:
1. A curing agent composition for two-pack type curable composition use, which comprises a hydrolyzable silyl group-containing compound (a), a non-phthalic acid ester based plasticizer (b) having no phthalic acid ester structure in its molecule, and a bivalent tin based curing catalyst (c), wherein at least one species of the hydrolyzable silyl group-containing compound (a) is an aminoalkyl group-containing silanecompound (e), and wherein a curable organic polymer having in its molecule a functional group crosslinkable by a reaction catalyzed by the bivalent tin based curing catalyst (c) is excluded from the curing agent composition.

2. The curing agent composition according to claim 1, wherein the non-phthalic acid ester based plasticizer (b) is at least one compound selected from the group consisting of aliphatic dibasic acid esters, glycol esters, aliphatic esters, phosphoric acid esters, epoxy plasticizers, ester based plasticizers, polyether based plasticizers, polystyrenes, hydrocarbon based plasticizers. buiadienc-acrylonitrilc copolymers and chlorinated paraffins.

3. The curing agent composition according to claim 1, wherein the non-phthalic acid ester based plasticizer (b) is at least one compound selected from the group consisting of polyether based plasticizers and hydrocarbon based plasticizers.

4. The curing agent composition according to claim 1, wherein the bivalent tin based curing catalyst (c) is at least one species selected from the group consisting of tin octylate, tin naphthenate, tin stearate and tin Versatate.

5. A two-pack type curable composition comprising as the first part a base resin composition (A) which comprises (d) a curable organic polymer having in its molecule a functional group that is crosslinkable in the presence of a bivalent tin based curing catalyst, (f) an epoxy group-containing silane compound and (g) an epoxy compound; the second part being a curing agent composition (B) comprising (a) a hydrolyzable silyl group-containing compound, (b) a non-phthalic acid ester-based plasticizer and (c) a bivalent tin curing catalyst.

6. The two-pack type curable composition according to claim 5, wherein the curable organic polymer (d) is an organic based polymer having a reactive silicon group.

7. The two-pack type curable composition according to claim 5, or 6, wherein the curable organic polymer (d) is at least one compound selected from the group consisting of polyoxyalkylene based copolymers, hydrocarbon based polymers, polyester based polymers, acrylic acid ester based polymers, graft polymers, polysulfide based polymers, polyamide based polynmers, polycarbonate based polymers and diallyl phthalate based polymers.

8. The two-pack type curable composition according to claim 7, wherein the polyoxyalkylene based polymer has a repeating unit represented by a general formula (5):

$$—R^1—O—  \qquad (5)$$

(wherein $R^1$ represents a bivalent organic group).

* * * * *